Patented Feb. 27, 1951

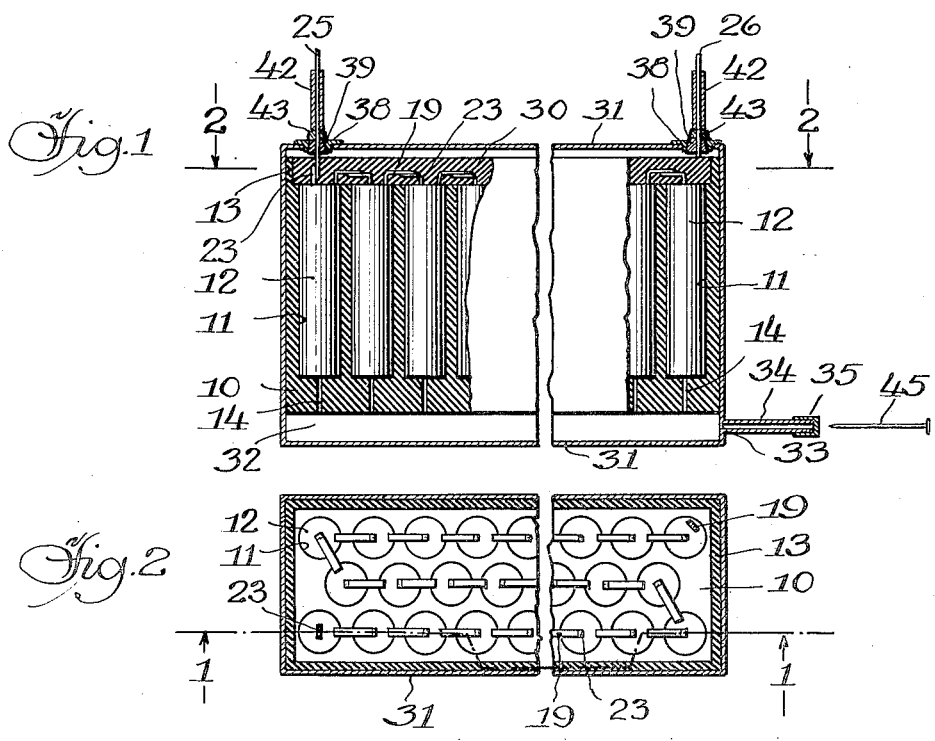
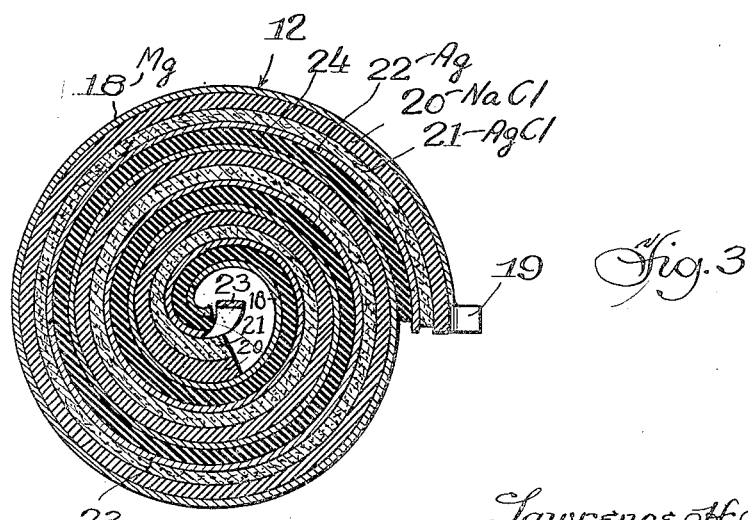

2,543,106

UNITED STATES PATENT OFFICE 2,543,106

DEFERRED ACTION PRIMARY BATTERY

Lawrence H. Harriss, Freeport, Ill., assignor, by mesne assignments, to Burgess Battery Company, Freeport, Ill., a corporation of Delaware Application December 26, 1946, Serial No. 718,285

5 Claims. (Cl. 136—90)

This invention relates to primary batteries, and particularly to an improved construction for primary batteries of the deferred action type.

It is the object of the invention to provide a deferred action primary battery for emergency or other use which is adapted to be activated by immersion in an activating liquid, which may be plain water.

There are occasions, which may or may not be in the nature of an emergency, when it is advantageous to have a battery which will be activated by the simple act of immersing it in an activating liquid, which may be a body of water such as the sea, after which it is capable of energizing a signal light or an electronic signal apparatus. It is desirable that the battery retain its full capacity for delivering energy even after a long period of disuse. The battery construction of the present invention is adapted for such purpose. It may be stored indefinitely without undergoing any substantial deterioration and is capable of delivering its full capacity of energy upon being immersed in an activating liquid.

In the drawing:

Fig. 1 is an elevational view, taken in section along broken line 1—1 of Fig. 2, of the improved battery construction of the invention;

Fig. 2 is a plan view taken along line 2—2 of Fig. 1, with the sealing material 30 removed; and Fig. 3 is an enlarged plan view of a single cell such as is used in the battery of the invention.

The casing or retaining member for the battery consists of a block 10 of non-conductive electrolyte resisting material, which may be a synthetic resin, such as polystyrene, polymerized methyl methacrylate, phenol formaldehyde resin, the copolymer of vinyl chloride and vinyl acetate, or the like. The block 10 is provided with a plurality of cell cavities or compartments 11 in each of which is arranged one of the cells 12 of the battery. In the specific construction shown, the block 10 is of rectangular shape and the cell cavities 11 are of elongated cylindrical shape, but the block and cell may be of any desired shape. The cell cavities 11 extend downwardly from the upper surface of the block 10 to a point spaced from the bottom surface thereof. An integral wall 13 projects upwardly from the upper surface of the block and extends around the periphery of the block to provide lateral support for a top sealing compound 30 as will be described hereinafter. A channel 14 extends downwardly from each cell cavity 11 through the base portion of the block 10 and provides communication between the cell cavity and the space surrounding the block. The channels 14 will be described more fully hereinafter.

A cell 12, such as is shown in Fig. 3, is disposed in each of the cavities 11. While the cell may be of any desired construction, in the specific form shown, it consists of a plurality of superposed sheet form elements wound together spirally into the form of a cylinder which fits into a cell cavity. Starting at the exterior of the cell, the elements comprise the metal negative electrode 18 which may be of any metal having a suitable electronegative potential, but preferably is composed of magnesium. A tab of metal is attached to the electrode 18 and extends upwardly to form a terminal 19. The next element is a sheet of non-conductive bibulous separating material 20, such as blotting paper or the like. If desired, this may be impregnated with a suitable electrolyte salt, such as sodium chloride, potassium chloride, lithium chloride, magnesium sulfate, or the like. This may be accomplished by moistening the bibulous material 20 with an aqueous solution of the salt and evaporating the liquid. This is preferably carried out before the cell is assembled. The next element is the layer 21 of water insoluble active material, which may be a water insoluble silver halide, preferably silver chloride. The next element is a sheet 22 of a suitable electropositive metal, preferably silver. The metal elements 18 and 22 may have the thickness of foil. The two elements 21 and 22 are in intimate contact with each other and form a composite electropositive electrode for the cell. At its inner end, the metal sheet 22 has a tab 23 extending upwardly therefrom to form a terminal 23 for the cell. The next element is a sheet of non-conductive material 24 which is resistant to the cell electrolyte and may be composed of varnished paper, paraffin-impregnated paper, rubber hydrochloride, the copolymer of vinyl acetate and vinyl chloride, or the like.

The elements are arranged in superposed relation and coiled into a spiral as shown in Fig. 3 to form a cylinder which is then inserted into one of the cell cavities 11. A similar cell is inserted into each of the cell cavities and the positive terminal 23 of one cell is connected to the negative terminal 19 of the adjacent cell by any suitable method as welding or soldering, whereby the cells are connected together in series to form a battery. If desired, some of the cells, or groups of series connected cells, may be connected in parallel with each other, as where it is desired to form a combination "A" and "B" battery. The positive electrode 23 of one end cell is connected, as by soldering, to the terminal conductor 25 of the battery, and the negative electrode 19 of the other end cell is similarly connected to the other battery terminal conductor 26. Thereafter the space above the cells 12 and encircled by the wall 13 is filled with a fusible sealing composition, such as wax or pitch, to form a seal closure 30 for the upper ends of the cells and the top of the battery. The sealing composition 30 is of a viscosity such that it does not flow down into the cells. The terminal conductors 25 and 26 extend upwardly from the closure 30, and are adapted to be connected to an external circuit.

The battery is enclosed in an outer container 31, which is preferably composed of thin sheet metal. The bottom wall of the container 31 is spaced away from the bottom of the block 10 to form a chamber 32, said arrangement being maintained by suitably attaching the side walls of the container to the side walls of the block, as by means of an adhesive. The lower portion of the container 31 has an opening 33 therein communicating with the chamber 32, and an open ended tube 34 is connected to said opening and extends outwardly from the container 31. A cup-shaped cap member 35, preferably composed of a thin material, such as metal foil, is telescoped over the outer end of the tube 34 and joined thereto as by an adhesive, or by soldering or welding, to form a seal closure for the tube.

The terminal conductors 25 and 26 extend upwardly through openings in the top wall of the container 31. Seal closures are formed around said conductors in said openings, comprising flanged rings 38, which are suitably attached to the container wall, as by soldering, and globules 39 of glass, or other suitable non-conductive material, which is flowed in the molten condition into the space between the conductors 25 and 26 and the rings 38 and allowed to solidify. This type of seal is well known and is not a part of the invention. Above the top wall of the container 31, the conductors 25 and 26 preferably have a covering of insulation 42, and if there is a gap between the insulation 42 and the seals 39, the conductors may at these points be covered with a suitable non-conductive composition 43, such as plastic polystyrene, nitrocellulose lacquer, or the like.

As stated above, channels 14 are provided in the base portion of the block 10 individually connecting the cell cavities 11 with the chamber 32. The channels 14 are of capillary magnitude in cross section, that is, they have a magnitude in cross section similar to that of an open ended capillary tube. Such a tube has the property that if one end thereof is submerged in water, the water will rise in the tube to a level substantially higher than the surface of the body of water. Channels having a diameter from approximately .01 inch to approximately .15 inch may be used, and the preferred size is a diameter of approximately .04 inch. That is, the cross sectional area may be from approximately .00008 square inch to approximately .018 square inch, and the preferred cross sectional area is approximately .0013 square inch. The length of the channels is preferably 0.05 inch or greater. In general, as the cross sectional area is made smaller, the length may be made less.

The interior of the container 31 is evacuated in any suitable manner. The evacuation withdraws air from the interiors of the container 31 and of the compartments 11 containing the cells 12. In particular, it withdraws air from the interelectrode spaces of the cells, which are occupied by the bibulous separating members 21.

In operation, when it is desired to use the battery, the conductors 25 and 26 are connected to the external circuit, which may be a light signal or an electronic signal apparatus, and the battery, or at least the tube 34 thereof, is immersed in a body of activating liquid. A dilute aqueous solution of a salt is suitable for the purpose. The battery is intended especially for use at sea and to be immersed in the salt water of the sea. The battery may also be actuated by plain water, where the bibulous layers 21 have been impregnated with a salt as described heretofore. In a battery employing the magnesium-silver-silver chloride system described heretofore electrolyte salts are not required to initiate operation and plain water may be used even though there are no electrolyte salts present.

The cap member 35 is then punctured by any suitable instrument such as the pin 45, or the tube 35 may be broken off of the container 31. The activating liquid then enters the evacuated container and passes through the channels 14 into the compartments 11, where it flows into the spaces occupied by the bibulous separators 21 and moistens said separators. The evacuation is preferably sufficient that the activating liquid substantially fills the cell cavities 11. The cells 12 immediately are activated and the battery delivers its normal voltage and electrical energy to energize the signal apparatus. Simultaneously, a gas is generated within each of the cells. In the cells described, hydrogen gas is liberated at the surfaces of the metal electrodes 20. The gas spreads within each of the cell cavities 11 and passes into the channels 14 and occupies said channels. The channels being of capillary size, as pointed out heretofore, have the property of excluding the activating liquid therefrom during the presence of the gas therein. That is, the gas does not bubble through the liquid in the channels in such manner that the cross sectional area of the channels is occupied simultaneously by the gas and the liquid, but rather the gas occupies the entire cross sectional area of the channels to the exclusion of the liquid. The gas-occupied channels, therefore, serve to effectively insulate or seal the cells one from another so that the battery is not short circuited. The activating liquid is sufficiently conductive that if it occupies the channels it causes destructive short circuits between the cells. The condition described above, in which the channels 14 are sealed by the gas, exists as long as the battery remains operative, or until it becomes exhausted. In practice, the battery has been found to be effective for the purpose and to provide a convenient means for supplying electrical energy by the simple act of immersion in sea water or other activating liquid.

While but a single embodiment of the invention has been described and illustrated, this is by way of example only, and the invention is not limited thereto. For example, the cells may be of a construction different from that described. The Leclanche type of cell having zinc and carbon electrodes, a depolarizer of manganese dioxide and an electrolyte which is an aqueous solution of ammonium chloride and zinc chloride, is also suitable for use. Any cell construction may be used in which the electrodes are of such character that a gas is generated when an activating liquid is introduced and the battery is connected to a load.

Other modifications may be made by those skilled in the art within the spirit of the invention, as the same is set forth in the appended claims.

What is claimed is:

1. In a primary battery adapted to be activated by immersion in a body of activating liquid, the combination of means forming a plurality of compartments, a cell in each of said compartments, each said cell comprising a pair of spaced apart positive and negative electrodes, the space between said electrodes being adapted to receive an activating liquid, means for electrically connecting said cells together, said cell electrodes and activating liquid being of such character that when said activating liquid is introduced into the interelectrode space of each cell and the battery is connected to a load, a voltage is generated by each cell and gas is generated in each compartment, said compartment-forming means having a plurality of channels leading therethrough and being connected individually to said compartments, said channels being of capillary size, the interior of said compartments being initially at subatmospheric pressure, and a breakable seal separating said channels from the space surrounding said battery.

2. The battery construction as claimed in claim 1, in which the channels have a cross sectional area of from approximately .00008 square inch to approximately .018 square inch.

3. The battery construction as claimed in claim 1, in which the channels have a cross sectional area of approximately .0013 square inch.

4. In a primary battery adapted to be activated by immersion in a body of activating liquid, the combination of means forming a plurality of compartments, a cell in each of said compartments, each said cell being composed of elements comprising a positive electrode and a negative electrode and a bibulous non-conductive separator between said electrodes, said bibulous separator being adapted to be moistened with an activating liquid, means for electrically connecting said cells together, said cell elements and said activating liquid being of such character that when said bibulous separators are moistened with said activating liquid and the battery is connected to a load, a voltage is generated by each cell and gas is generated in each compartment, said compartment forming means having a plurality of channels leading therethrough and being connected individually to said compartments, said channels being of capillary size, and means enclosing a space exteriorly of said compartment forming means and in communication with said channels, said space being initially at subatmospheric pressure, said space enclosing means being rupturable.

5. In a primary battery adapted to be activated by immersion in a body of activating liquid, the combination of means forming a plurality of compartments, a cell in each of said compartments, each said cell being composed of elements comprising a positive electrode and a negative electrode and a bibulous non-conductive separator between said electrodes, said bibulous separator being adapted to be moistened with an activating liquid, means for electrically connecting said cells together, said cell elements and said activating liquid being of such character that when said bibulous separators are moistened with said activating liquid and the battery is connected to a load, a voltage is generated by each cell and gas is generated in each compartment, said compartment forming means having a plurality of channels leading therethrough and being connected individually to said compartments, said channels being of capillary size, the interiors of said compartments being initially at subatmospheric pressure, and a breakable seal separating said channels from the space surrounding said battery.

LAWRENCE H. HARRISS.

REFERENCES CITED

The following references are of record in the file of this patent:

UNITED STATES PATENTS

| Number | Name | Date |
|---|---|---|
| 300,666 | Vetter et al. | June 17, 1884 |
| 563,127 | Boynton | June 30, 1896 |
| 1,327,121 | Sturges | Jan. 6, 1920 |
| 1,548,539 | Martus | Aug. 4, 1925 |
| 2,382,675 | Southerland | Aug. 14, 1945 |
| 2,428,850 | Lawson | Oct. 14, 1947 |

OTHER REFERENCES

Vinal, "Storage Batteries" (1924), pages 233 and 234, John Wiley and Sons, Inc., New York.